United States Patent
Blauch et al.

(10) Patent No.: US 7,222,672 B2
(45) Date of Patent: May 29, 2007

(54) WELLBORE FLUIDS CONTAINING ADDITIVES FOR REMOVING A FILTER CAKE AND METHODS OF USING THE SAME

(75) Inventors: Matthew E. Blauch, Duncan, OK (US); David W. Ritter, Katy, TX (US); Sanjay Vitthal, Houston, TX (US); R. Ashley Donaldson, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 219 days.

(21) Appl. No.: 10/759,408

(22) Filed: Jan. 16, 2004

(65) Prior Publication Data

US 2005/0155761 A1 Jul. 21, 2005

(51) Int. Cl.
*E21B 43/04* (2006.01)
(52) U.S. Cl. .................... 166/278; 166/312
(58) Field of Classification Search ............. 166/300, 166/278, 312; 175/72
See application file for complete search history.

(56) References Cited

U.S. PATENT DOCUMENTS

| | | | |
|---|---|---|---|
| 3,810,834 A | 5/1974 | Jones et al. | 210/58 |
| 3,885,630 A | 5/1975 | Richardson | 166/307 |
| 3,889,753 A | 6/1975 | Richardson | 166/307 |
| 4,552,215 A | 11/1985 | Almond et al. | 166/278 |
| 4,740,318 A | 4/1988 | Hale et al. | 252/8.514 |
| 5,084,192 A | 1/1992 | Dill et al. | 252/8.552 |
| 5,671,810 A * | 9/1997 | Hodge et al. | 166/301 |
| 5,678,632 A | 10/1997 | Moses et al. | 166/307 |
| 5,710,109 A | 1/1998 | Surles | 507/114 |
| 5,888,944 A | 3/1999 | Patel | 507/110 |
| 5,960,879 A | 10/1999 | Echols | 166/278 |
| 5,977,031 A | 11/1999 | Patel | 507/138 |
| 6,218,342 B1 | 4/2001 | Patel | 507/129 |
| 6,432,885 B1 | 8/2002 | Vollmer | 507/236 |
| 6,631,764 B2 * | 10/2003 | Parlar et al. | 166/278 |

FOREIGN PATENT DOCUMENTS

| | | |
|---|---|---|
| WO | WO 00/57022 | 9/2000 |
| WO | WO 01/12698 | 1/2001 |

OTHER PUBLICATIONS

Halliburton brochure entitled "BARACARB® Bridging Agent" dated 2002.
Halliburton brochure entitled "BROMI-MUL™ Emulsifier" dated 2002.

* cited by examiner

*Primary Examiner*—Jennifer H. Gay
*Assistant Examiner*—Nicole A Coy
(74) *Attorney, Agent, or Firm*—Craig W. Roddy; Conley Rose

(57) ABSTRACT

Wellbore servicing fluids and methods of using the same to service a wellbore in a subterranean formation are provided. A filter cake in the wellbore is contacted with the gravel packing fluid, which comprises an oil-soluble additive capable of removing the filter cake. The additive undergoes hydrolysis to produce an acid upon contacting water provided from, for example, water in the wellbore servicing fluid, connate water in the subterranean formation, water in the filter cake, water produced by the subterranean formation, water pumped into the wellbore, or combinations thereof. The acid dissolves particulates in the filter cake in situ. In an embodiment in which the wellbore servicing fluid serves as a gravel packing fluid, the fluid also deposits gravel along the face of the subterranean formation, forming a barrier against the migration of sand from the formation and into the wellbore.

19 Claims, No Drawings

WELLBORE FLUIDS CONTAINING ADDITIVES FOR REMOVING A FILTER CAKE AND METHODS OF USING THE SAME

FIELD OF THE INVENTION

This invention generally relates to wellbore servicing fluids and methods of using the same. More specifically, the invention relates to methods of servicing a wellbore in contact with a subterranean formation using a fluid containing an oil soluble additive for removing a filter cake from the face of the subterranean formation.

BACKGROUND OF THE INVENTION

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids. Such drilling fluids form a thin, slick filter cake on the formation face that provides for successful drilling of the wellbore and that helps prevent loss of fluid to the subterranean formation.

Several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. The primary production stage usually yields only about 5% to 15% of the oil in the reservoir. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Secondary flooding usually recovers up to an additional 50% of the original oil in the reservoir. Tertiary recovery operations such as tertiary flooding may also be used to drive the remaining oil from the formation to the production well. Unfortunately, the presence of the filter cake on the face of the subterranean formation can adversely affect the flow of fluid though the injection wells and the production wells. In the case of the injection wells, particularly in deepwater environments, the injected fluid is not flowed back to remove the filter cake left by the drill-in fluid. The pump pressures (e.g., fracturing pressures) required to inject past the filter cake are higher than desirable for achieving good sweep efficiency of the oil.

Many subterranean formations are unconsolidated or poorly consolidated. Thus, loose sand grains may undesirably flow into an adjacent production well, contaminating the fluid being recovered from the well. The sand could cause severe erosion of well equipment and could plug the flow passages into the well such that an expensive workover of the well is required. One method commonly utilized to prevent migration of sand into wells and to maintain the integrity of subterranean formations is a well completion method known as gravel packing. In gravel packing, a permeable screen is placed against the face of a subterranean formation, followed by packing gravel against the exterior of the screen. The size of the gravel particles used for this purpose are larger than the sand particles but are also small enough to ensure that sand cannot pass through voids between the particles. The gravel is typically carried to the subterranean formation by suspending the gravel in a so-called gravel packing fluid and pumping the fluid to the formation. The screen blocks the passage of the gravel but not the fluid into the subterranean formation such that the screen prevents the gravel from being circulated out of the hole, which leaves it in place. The gravel is separated from the fluid as the fluid flows through the screen leaving it deposited on the exterior of the screen. Fluid leakoff into the formation matrix can also result in the sand being placed around the screen.

Once an open hole wellbore or interval has been drilled to penetrate a subterranean formation, the filter cake cannot be removed from the face of the formation before gravel packing the formation. Otherwise, an excessive amount of fluid containing sand could pass from the formation into the wellbore while attempting to remove the filter cake. Horizontal wellbores are particularly limited in this respect because they are typically thousands of feet in length and thus have a relatively large surface area through which fluid can pass. Further, using an acid wash to remove the filter cake after the gravel has been placed in the well is usually not an option due to the excessive cost involved combined with the inherent difficulty in placing acid uniformly across the entire interval without excessive leak-off of the acid into the localized areas along the wellbore, particularly in horizontal completions. In post drilling acidizing, an additional risk of damaging the formation from the spent or partially spent acid leaking off into the formation exists. A need therefore exists for relatively inexpensive methods of removing a filter cake from a subterranean formation without risking the loss of substantial amounts of potentially damaging fluid into the formation.

SUMMARY OF THE INVENTION

In an embodiment, wellbore servicing fluids include an additive that is capable of removing a filter cake from a face of a subterranean formation penetrated by a wellbore. The wellbore servicing fluids may be oil-based fluids, invert emulsion fluids, or reversible emulsion fluids. The additive for removing the filter cake is dissolved in the oil phase of the wellbore servicing fluids. The additive is capable of undergoing hydrolysis to produce an acid when it comes in contact with water. The acid produced by the additive is capable of dissolving particulates in the filter cake such as calcium carbonate particulates. It is also capable of converting a reversible water-in-oil emulsion of the filter cake to an oil-in-water emulsion for facilitating removal of the filter cake. The wellbore servicing fluid may be, for example, a gravel packing fluid, a drilling fluid, a completion fluid, a displacement fluid, or a work-over fluid.

In another embodiment, methods of servicing a wellbore in a subterranean formation include providing the foregoing wellbore servicing fluid comprising an additive for removing a filter cake from the formation, followed by contacting the filter cake with the fluid. Such a filter cake is formed on the face of the subterranean formation while using a drilling fluid to drill a wellbore that penetrates the subterranean formation. The additive undergoes hydrolysis to produce an acid upon contacting water provided from, for example, water in the wellbore servicing fluid, connate water in the subterranean formation, water in the filter cake, water produced by the subterranean formation, water pumped into the wellbore, or combinations thereof. The created acid dissolves particulates in the filter cake. In addition to removing the filter cake from the subterranean formation, the gravel packing fluid also deposits gravel along the face of the subterranean formation, forming a barrier against the migration of sand from the formation and into the wellbore.

DETAILED DESCRIPTION OF THE PREFERRED EMBODIMENTS

In an embodiment, a wellbore servicing fluid comprises at least one additive capable of removing a filter cake from the face of a subterranean formation. The filter cake builds up on the formation face during the drilling of a wellbore that penetrates the formation. The filter cake can be removed by contacting it with the wellbore servicing fluid. As used herein "wellbore servicing fluid" refers to a fluid used in drilling, gravel packing, and/or work-over applications such as a drilling fluid, a gravel packing fluid, a completion fluid, a displacement fluid, and a work-over fluid, all of which are well known in the art.

The additive employed in the gravel packing fluid is an oil-soluble compound that undergoes hydrolysis to produce acid in the presence of a hydroxide ion such as the hydroxide ion formed by water, wherein the acid is capable of dissolving particulates in the filter cake such as calcium carbonate particulates. Hereinafter, the additive will be referred to as an oil-soluble additive (OSA). If the filter cake is formed from a reversible emulsion drilling fluid, the acid produced by the OSA is also capable of converting a water-in-oil emulsion in the filter cake to an oil-in-water emulsion that can be more easily cleaned as will be described later in more detail. Examples of OSA's include, but are not limited to, organic anhydrides such as acetic anhydride, glycols, and esters, all of which form organic acid when hydrolyzed. By way of example, acetic anhydride forms acetic acid when it is hydrolyzed, as demonstrated by the following chemical equation:

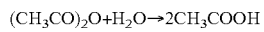

$$(CH_3CO)_2O + H_2O \rightarrow 2CH_3COOH$$

The amount of OSA in the wellbore servicing fluid is preferably in the range of from about 0.1 weight % (wt. %) to about 25 wt. % by total weight of the wellbore servicing fluid, more preferably from about 5 wt. % to about 10 wt. %.

The liquid of the wellbore servicing fluid contains an oil phase in which the OSA is dissolved. Examples of suitable liquids for the gravel packing fluid include, but are not limited to, an oil-based fluid, an invert emulsion fluid (i.e., a water-in-oil type emulsion), and a reversible emulsion fluid (i.e., a fluid that can be readily and reversibly converted from a water-in-oil emulsion to an oil-in-water emulsion), with the reversible emulsion fluid being preferred. An invert emulsion fluid and a reversible emulsion fluid in its water-in-oil state contain a continuous phase of oil and a discontinuous phase of water, wherein the discontinuous phase, also known as the dispersed phase, forms a stable dispersion of fine droplets throughout the continuous phase. A suitable commercially available invert emulsion fluid is the BROMIMUL invert emulsion fluid manufactured by Halliburton Energy Services, Inc. The oil in the gravel packing fluid may be, for example, petroleum oil, natural oil, synthetically derived oil, or combinations thereof. Preferably, the oil is an alpha olefin, an internal olefin, a diester of carbonic acid, a paraffin, kerosene oil, diesel oil, mineral oil, or combinations thereof. In embodiments where the liquid is an invert emulsion fluid or a reversible emulsion fluid, the water contained therein may be, for example, municipal treated or fresh water, sea water, naturally-occurring brine, a chloride-based, bromide-based, or formate-based brine containing monovalent and/or polyvalent cations, or combinations thereof. Examples of chloride-based brines include sodium chloride and calcium chloride. Examples of bromide-based brines include sodium bromide, calcium bromide, and zinc bromide. Examples of formate-based brines include sodium formate, potassium formate, and cesium formate. When the wellbore servicing fluid is an invert emulsion fluid or a reversible emulsion fluid, it may contain from about 30 wt. % to about 50 wt. % oil and from about 50 wt. % to about 70 wt. % water, all weight percentages being based on the total weight of the wellbore servicing fluid.

In an embodiment in which the wellbore servicing fluid is a gravel packing fluid, the fluid comprises a liquid with gravel suspended therein and the additive described above. The gravel packing fluid can be used to perform in situ removal of the filter cake and deposition of gravel on the wellbore wall. The gravel forms a barrier to the passage of formation sand-containing fluids that could otherwise exit the subterranean formation. As such, the filter cake can be removed before substantial amounts of formation sand-containing fluids are lost from the subterranean formation. The gravel used in the gravel packing fluid comprises solid particles that can be suspended in the gravel packing liquid. The median size of the gravel particles are larger in diameter than the median particle size of the subterranean formation sand. Preferably, the median size of the gravel particles are also small enough to ensure that the formation sand particles cannot pass through the openings between the gravel particles once the gravel particles have been deposited on the wellbore wall or within perforation tunnels. Examples of materials that may be used to form the gravel include, but are not limited to, graded siliceous sand, spherical glass beads, ceramic materials, and bauxite. Any of the foregoing materials may be coated with one or more thermally activated phenolic resins, epoxy compounds, and/or tackifiers. The amount of gravel in the gravel packing fluid preferably ranges from about 0.1 pound of gravel/gallon of fluid to about 15 pounds of gravel/gallon of fluid, more preferably about 4 pounds of gravel/gallon of fluid.

Optionally, the wellbore servicing fluid may contain a polymer breaker to assist the OSA in the removal of polymer-containing filter cakes. Examples of suitable polymer breakers include, but are not limited to, oxidants and enzymes. Suitable polymer breakers are disclosed in International Publication No. WO 00/57022, which is incorporated by reference herein.

As described previously, the wellbore servicing fluid may serve as various types of fluids and thus may include additional additives as deemed appropriate by one skilled in the art. For example, it would be understood by one skilled in the art that a gravel packing fluid could comprise surfactants, emulsifiers, non-emulsifiers, wetting agents, organophilic clays, viscosifiers, weighting agents, bridging agents, fluid loss control agents, oxidizing agents, iron control additives, pH buffers, and scale inhibitors. It is preferred that any additional materials do not interfere with the reversibility of the fluid.

The steps used to prepare an invert emulsion fluid/reversible emulsion fluid for use in the wellbore servicing fluid would be apparent to one skilled in the art. For example, a desired quantity of an oleaginous fluid may be mixed with a suitable amount of an emulsifier, followed by adding the desired amounts of water and any other additives while continuously mixing.

In embodiments in which the wellbore servicing fluid is a reversible emulsion, the fluid can be readily and reversibly converted from a water-in-oil emulsion to an oil-in-water emulsion by increasing the hydrogen ion concentration of the fluid. The hydrogen ion concentration may be increased by contacting the fluid with an effective amount of an acid to cause its conversion. One or more amine emulsifiers present in the fluid are protonated by the hydrogen ions. The resulting protonated amine has a cationic charge that increases its water and acid solubility. As a result, the fluid now favors a water external emulsion state.

The steps used to prepare the wellbore servicing fluid for use in servicing a wellbore that penetrates a subterranean formation would be apparent to one skilled in the art. The different components in the wellbore servicing fluid can be combined at the drilling site prior to its use. For example, the preparation of a gravel packing fluid may entail vigorously mixing a desired quantity of the liquid being used with a suitable amount of the OSA, followed by adding a suitable amount of gravel to the liquid. As a result, the OSA becomes dissolved in the oil-phase of the liquid, and the gravel becomes suspended in the liquid. The OSA and the gravel can be added to the liquid in any sequential order or at the same time. In an embodiment, the OSA is added to the liquid before the addition of the gravel.

In an embodiment, the wellbore servicing fluid may be used to gravel pack a subterranean formation. The gravel packing may be performed by first moving a permeable screen, e.g., a wire mesh screen, into a wellbore and placing the screen adjacent to the face of a subterranean formation penetrated by the wellbore. The screen contacts a filter cake that has formed on the formation face as a result of drilling the wellbore using a drilling fluid such as a reversible emulsion fluid. The foregoing gravel packing fluid containing the OSA is then pumped into the wellbore in such a manner that it contacts the filter cake and the screen on the face of the subterranean formation. The OSA undergoes hydrolysis, thus forming an acid that dissolves particulates such as calcium carbonate particulates in the filter cake. In one embodiment, when subjected to downhole temperatures the OSA may react with, if present, water in the fluid itself, connate water in the subterranean formation, water in the filter cake, water produced by the subterranean formation, and/or water pumped into the wellbore. A gravel pack apparatus that may be used in conjunction with the gravel packing fluid described herein is disclosed in U.S. Pat. No. 5,960,879, which is incorporated by reference herein in its entirety.

In another embodiment, a completion or displacement fluid containing the OSA can also be utilized in an open wellbore having a screen, e.g., a conventional wire wrapped screen, a pre-packed wire wrapped screen, or a premium filter media for sand control, but no gravel pack. The fluid may serve to remove a filter cake in the same manner as described above. A completion fluid containing the OSA may be circulated into place once the screen completion assemblies are in place across the open hole interval. A displacement fluid containing the OSA may be used for the displacement of the drilling fluid from the open hole once an expandable screen is placed across the formation face. The methods by which the foregoing wellbore servicing fluid may be used in other applications such as in drilling and work-over applications would be apparent to one of ordinary skill in the art.

The wellbore servicing fluid is particularly useful in removing a filter cake formed from a reversible emulsion drilling fluid. Without intending to be limited by theory, it is believed that the mechanism by which the wellbore servicing fluid removes the filter cake is that the acid produced by the OSA causes the oil in the filter cake to change from the continuous phase to the discontinuous phase and the water in the filter cake to change from the discontinuous phase to the continuous phase. As a result of this conversion, the oil-wet particles of the filter cake become water-wet, allowing the acid to readily reach and dissolve the acid soluble particulates, e.g., the calcium carbonate particulates, in the filter cake. Thus, filter cakes formed from a reversible emulsion drilling fluid typically can be removed more effectively and rapidly using the wellbore servicing fluid described herein than those formed from a non-reversible drilling fluid.

When the wellbore servicing fluid serves as a gravel packing fluid, it not only removes the filter cake, it also concurrently deposits gravel on the exterior of the screen adjacent to the face of the subterranean formation. In particular, the gravel in the fluid is filtered by the screen as the fluid passes through the screen to the subterranean formation. In this manner, the gravel becomes sufficiently packed on the exterior of the formation to form a barrier to sand that could otherwise pass from the subterranean formation into the wellbore. That is, the openings between the gravel particles are small enough to prevent the sand from passing therethrough. As a result, the gravel filters the sand from the fluids that exit the subterranean formation and pass into the wellbore during production. Removal of the filter cake may continue in situ after the gravel has been deposited on the face of the subterranean formation.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Comparative Example 1

A filter cake was formed using the following static filtration test. A calcium carbonate weighting material was prepared by mixing 1 part BARACARB 5 weighting material with 3 parts BARACARB 25 weighting material, both of which are sold by Baroid Industrial Drilling Products, Inc. About 500 milliliters (mL) of an oil-based mud (OBM), i.e., a diesel-based mud recovered from a test well site, were then blended with 10 pounds per gallon (ppg) of the calcium carbonate weighting material. Approximately 200 mL of the resulting OBM mixture were placed on a porous ceramic disc (35 micron) of a high-temperature high pressure (HTHP) cell. The ceramic disc was then placed in a heat jacket having a temperature of 170° F. and connected to a pressure source. Nitrogen pressure (500 psig) was applied to the HTHP cell while measuring the filtrate volume passing through the porous ceramic disc. The filtrate volume was monitored at time intervals ranging from 1 minute to 10 minutes for a duration of 1 hour after which time the HTHP cell remained under pressure overnight (approximately 12 to 24 hours). The filtrate volume was measured to be 1 mL after 30 minutes and 21 mL after 15 hours. As a result of the removal of liquid from the OBM mixture, a filter cake having a uniform thickness of about 2 mm formed on the porous ceramic disc. The fluid removed from the HTHP cell was flowable and appeared to be similar to the original OBM.

Example 1

The static filtration test was performed in the same manner as described in Comparative Example 1 except that 10 weight % of an acetic anhydride OSA was blended with the OBM before placing it on the porous ceramic disc. Nitrogen gas undesirably began to bypass around the perimeter of the filter cake sometime overnight. The filtrate volume was measured to be 2.5 mL after 30 minutes and 31.5 mL after 15 hours. The fluid removed from the HTHP appeared to be highly viscous with a consistency like that of peanut butter. It had to be scooped from the cell. No filter cake was observed.

Example 2

The static filtration test was performed in the same manner as described in Comparative Example 1 except that the HTHP cell was kept under pressure only for 30 minutes. The filtrate volume was measured to be 1.4 mL after 30 minutes. A filter cake having a uniform thickness of about 1 mm was formed. The fluid removed from the HTHP cell appeared to be similar to the original OBM.

A filter cake removal test was then performed by placing approximately 200 mL of a mixture of BROMIMUL invert emulsion fluid containing 10 weight % OSA by weight of the fluid in the HTHP cell containing the residual OBM filter cake. Nitrogen pressure (500 psig) was again applied to the HTHP cell. The subsequent fluid loss and cleanup characteristics of the above mixture were observed. The volume of mixture that had passed through the porous ceramic disc after 60 minutes was measured to be 8.2 mL. The fluid removed from the HTHP cell appeared to be translucent and amber in color. The filter cake appeared to become loose and delaminated during this time. It was also entrained with gas bubbles such that its appearance was similar to rising bread dough, indicating acid dissolution of the calcium carbonate particles contained within the OBM filter cake.

Example 3

A test was also performed to examine the degree of reaction of an OSA with calcium carbonate. First, BROMIMUL invert emulsion fluid was blended with 10 pounds of BARACARB 25 calcium carbonate (a weighting/fluid loss control material) per gallon of the fluid. Then 10 weight % of an OSA by total weight of the BROMIMUL/BARACARB 25 mixture was added to the mixture. Transmitted plane and polarized light microscopy was performed using a BH2 microscope manufactured by Olympus America, Inc to observe both the emulsion character and the reactivity of the calcium carbonate throughout a four day period at room temperature and a two day period at 170° F. Hydrolysis of the OSA was initially inhibited because not enough water was in direct contact with the OSA due to a physical barrier created by the OSA being contained within the external oil phase of the BROMIMUL invert emulsion fluid. Free water was then added to the mixture. Upon addition of the free water, the OSA produced an acid that reacted with the calcium carbonate. This example illustrates that, if desired, the reaction of the OSA after it has been placed downhole may be delayed until free water has been pumped downhole.

The foregoing diesel-based OBM showed desired behavior. The BROMIMUL invert emulsion fluid performed better than the diesel-based OBM in that its viscosity did not increase significantly during the static filtration test. Using a gravel packing fluid containing a BROMIMUL invert emulsion fluid and an OSA may be a viable approach to achieving integral filter cake clean-up without compromising short-term fluid loss protection.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation, comprising:
   (a) providing a wellbore servicing fluid comprising an additive for removing a filter cake from a face of the subterranean formation wherein the additive for removing the filter cake is dissolved in an oil phase of the wellbore servicing fluid; and
   (b) contacting the filter cake with the additive to thereby remove the filter cake;
   wherein the additive hydrolyses in situ when the additive contacts the filter cake and wherein the hydrolysis occurs substantially in the absence of a catalyst.

2. The method of claim 1, wherein the removal of the filter cake and the servicing of the wellbore are performed in situ.

3. The method of claim 1, wherein the wellbore extends in a horizontal direction.

4. The method of claim 1, wherein the wellbore servicing fluid comprises gravel suspended therein, wherein the gravel is deposited in the wellbore concurrent with the removal of the filter cake.

5. The method of claim 4 wherein an amount of the gravel present in the wellbore servicing fluid ranges from about 0.1 to about 15 pounds of gravel/gallon of the fluid.

6. The method of claim 1, wherein the wellbore servicing fluid is selected from the group consisting of an oil-based fluid, an invert emulsion fluid, and a reversible emulsion fluid.

7. The method of claim 6, wherein the wellbore servicing fluid comprises from about 30% to about 50% oil and from about 50% to about 70% water when the fluid is an invert emulsion fluid or a reversible emulsion fluid, all weight percentages being by total weight of the wellbore servicing fluid.

8. The method of claim 1, wherein the additive is an oil-soluble compound that undergoes hydrolysis in the wellbore to produce an acid.

9. The method of claim 8, wherein the acid dissolves particulates in the filter cake.

10. The method of claim 9, wherein the particulates comprise calcium carbonate.

11. The method of claim 8, wherein the filter cake is formed from a reversible water-in-oil emulsion.

12. The method of claim 11, wherein the acid converts the reversible water-in-oil emulsion of the filter cake to an oil-in-water emulsion.

13. The method of claim 8, wherein the additive undergoes hydrolysis when it contacts water provided from water in the wellbore servicing fluid, connate water in the subterranean formation, water in the filter cake, water produced by the subterranean formation, water pumped into the wellbore, or combinations thereof.

14. The method of claim 8, wherein the additive comprises organic anhydrides, glycols, esters, or combinations thereof.

15. The method of claim 8 wherein the wellbore servicing fluid further comprises a polymer breaker.

16. The method of claim 1, wherein an amount of the additive present in the wellbore servicing fluid ranges from about 0.1% to about 26% by total weight of the fluid.

17. The method of claim 1 wherein the additive is acetic anhydride.

18. The method of claim 1 wherein the additive hydrolyses in less than about 1 hour.

19. The method of claim 1 wherein the hydrolysis is delayed until the additive contacts free water.

* * * * *